(12) United States Patent
Ju et al.

(10) Patent No.: US 8,035,794 B2
(45) Date of Patent: Oct. 11, 2011

(54) DOUBLE-LAYER LIQUID CRYSTAL LENS

(75) Inventors: Ching-Yuan Ju, Taichung (TW); Zhi-Long Luo, Taichung (TW); Chi-Hung Lin, Shigang Township (TW); Yu-Te Chen, Changhua (TW)

(73) Assignee: United Radiant Technology Corporation, Taichung (TW)

( * ) Notice: Subject to any disclaimer, the term of this patent is extended or adjusted under 35 U.S.C. 154(b) by 261 days.

(21) Appl. No.: 12/461,672

(22) Filed: Aug. 20, 2009

(65) Prior Publication Data
US 2010/0060823 A1 Mar. 11, 2010

(30) Foreign Application Priority Data
Sep. 9, 2008 (TW) .............................. 97134510 A

(51) Int. Cl.
*G02F 1/13* (2006.01)
(52) U.S. Cl. ....................................................... 349/200
(58) Field of Classification Search .................... 349/200
See application file for complete search history.

(56) References Cited

U.S. PATENT DOCUMENTS
4,572,616 A * 2/1986 Kowel et al. .................. 349/200
7,218,429 B2 * 5/2007 Batchko .......................... 359/15

FOREIGN PATENT DOCUMENTS
JP 2006313243 11/2006
* cited by examiner

*Primary Examiner* — James Dudek
(74) *Attorney, Agent, or Firm* — Bacon & Thomas, PLLC

(57) ABSTRACT

A double-layer liquid crystal lens comprises a first transparent substrate, a second transparent substrate, a third transparent substrate, a first liquid crystal layer interposed between the first and the second transparent substrates, and a second liquid crystal layer interposed between the second and the third transparent substrates. The upper side of the first transparent substrate is provided with a transparent ITO electrode and an alignment film disposed on the transparent electrode. Each of the upper and the lower sides of the second transparent substrate is provided with a alignment film. The upper side of the third transparent substrate is provided with an apertured electrode while the lower side thereof is provided with an alignment film. The first and the third transparent substrates are made of glass while the second transparent substrate is made of plastic material. The total thickness of the double-layer liquid crystal lens is further reduced by forming the second transparent substrate with a thinner plastic transparent substrate.

12 Claims, 2 Drawing Sheets ced by current technology should have a thickness of at least 0.4 mm. This means that the double-layer liquid crystal lens having three transparent glass substrates has a thickness of at least 1.2 mm. Such a double-layer liquid crystal lens is shown in FIG. 1 of Japanese Patent Publication No. 2006-313243.

DOUBLE-LAYER LIQUID CRYSTAL LENS

BACKGROUND OF THE INVENTION

1. Field of Invention

This invention relates to a liquid crystal lens, particularly to a double-layer liquid crystal lens and a method of manufacturing the liquid crystal lens.

2. Brief Description of Prior Art

Recently, a liquid crystal lens using liquid crystal as optical material is widely applied in various electronic devices such as a mobile phone with a built-in camera, digital camera, video camera and web camera etc., due to its light-weight, slim property and the feature of enabling the change on optical properties without mechanical moving parts. A conventional double-layer liquid crystal lens has three layers of transparent substrates in which two liquid crystal layers are interposed therebetween. A glass substrate which can be processed by current technology should have a thickness of at least 0.4 mm. This means that the double-layer liquid crystal lens having three transparent glass substrates has a thickness of at least 1.2 mm. Such a double-layer liquid crystal lens is shown in FIG. 1 of Japanese Patent Publication No. 2006-313243.

SUMMARY OF THE INVENTION

The main object of this invention is to provide a thinner double-layer liquid crystal lens and its manufacturing method. The double-layer liquid crystal lens according to the present invention comprises a first transparent substrate, a second transparent substrate, a third transparent substrate, a first liquid crystal layer interposed between the first and the second transparent substrates, and a second liquid crystal layer interposed between the second and the third transparent substrates. The first and the third transparent substrates are made of glass while the second transparent substrate is made of plastic material. Because the second transparent substrate is made of plastic material, the second transparent substrate can be formed into a thinner one with a thickness of 0.1 mm or less. Therefore, the total thickness of the double-layer liquid crystal lens can be further reduced to 1.0 mm or less.

Furthermore, according to one aspect of the present invention, the first and third transparent substrates can be further thinned mechanically or chemically.

The above and other objects and advantages of the present invention will become apparent from the following description with reference to the accompanying drawings which illustrate examples of the present invention.

DETAILED DESCRIPTION OF THE PREFERRED EMBODIMENTS

In FIG. 1, the double-layer liquid crystal lens according to the present invention is designated by reference number 10. FIG. 1 illustrates the double-layer liquid crystal lens 10 of the first embodiment according to the present invention, which comprises in order from the bottom to the top: a first transparent substrate 12, a first liquid crystal layer 18, a second transparent substrate 14, a second liquid crystal layer 20 and a third transparent substrate 16. The first transparent substrate 12 and the third transparent substrate 16 are made of glass while the second transparent substrate 14 is made of plastic material which may be one of PET, PEN, PC, PES, PI and ARTON (registered trademark, manufactured by JSR Corp.), or other materials having similar properties of the above materials, such as materials having high optical transmittance, good heat resistance, low thermal expansion, low thermal contraction, low water absorbency, low birefringence, high gas-barrier property and good chemical resistance. Because the second transparent substrate 14 is made of plastic material, it is possible for the second transparent substrate to be as thin as 0.1 mm or even less.

The upper side of the first transparent substrate 12 is provided with a transparent ITO (Indium Tin Oxide) electrode 22 and a first alignment film 24 disposed on the transparent ITO electrode 22. The upper and lower sides of the second transparent substrate 14 are provided with a second alignment film 26 and a third alignment film 28 respectively. The upper and lower sides of the third transparent substrate 16 are provided with an apertured electrode 32 and a fourth alignment film 30 respectively.

The alignment direction of the first alignment film 24 is identical or parallel to the alignment direction of the second alignment film 26 while the alignment direction of the third alignment film 28 is identical or parallel to the alignment direction of the fourth alignment film 30 and perpendicular to the alignment direction of the first and second alignment films 24, 26.

The first liquid crystal layer 18 is interposed between the first and second transparent substrates 12, 14 and surrounded by a frame 34. The second liquid crystal layer 20 is interposed between the second and third transparent substrates 14, 16 and surrounded by a frame 36. Spacers are mixed into the frames 34, 36 for defining the distance between the adjacent transparent substrates.

A double-layer liquid crystal lens 10a of the second embodiment according to the present invention is illustrated in FIG. 2. The second embodiment is different from the first embodiment in that, in the second embodiment, the first alignment film 24 is directly disposed on the upper side of the first transparent substrate 12, and the lower side of the first transparent substrate 12 is provided with an apertured electrode 38.

A double-layer liquid crystal lens 10b of the third embodiment according to the present invention is illustrated in FIG. 3. On the basis of the first embodiment, the double-layer liquid crystal lens 10b is further provided with a first transparent insulation layer 40 on the apertured electrode 32 and a transparent ITO electrode 42 disposed on the transparent insulation layer 40.

A double-layer liquid crystal lens 10c of the fourth embodiment according to the present invention is illustrated in FIG. 4. On the basis of the second embodiment, the double-layer liquid crystal lens 10c is further provided with a first transparent insulation layer 40 on the apertured electrode 32 and a transparent ITO electrode 42 disposed on the transparent insulation layer 40, and furthermore provided with a second transparent insulation layer 44 on the lower side of the apertured electrode 38 and a transparent ITO electrode 46 disposed on the lower side of the second transparent insulation layer 44.

The first and second transparent insulation layers 40, 44 may be made of glass or plastic material or formed by coating.

In the above double-layer liquid crystal lens, the focal length of the liquid crystal lens, including the distance from the virtual focus (divergence) to the center of the liquid crystal lens and the distance from the real focus (convergence) to the center of the liquid crystal lens, can be varied by controlling the voltage applied on the electrodes formed on the transparent substrates and/or the electrodes formed on the transparent insulation layers.

The method according to the present invention will be described in conjunction with manufacture of the double-layer liquid crystal lens of the first embodiment in reference to FIG. 5 as below.

The method according to the present invention comprises the steps of:

provSiding a transparent substrate 12;

forming a transparent ITO electrode 22 on one side of the transparent substrate 12;

forming a first alignment film 24 on the transparent ITO electrode 22;

rubbing the first alignment film 24 in a first direction with a long filament fabric;

applying a frame 34 to the side of the first transparent substrate 12 formed with the first alignment film 24;

providing a second transparent substrate 14;

forming a second alignment film 26 on one side of the second transparent substrate 14;

rubbing the second alignment film 26 in the first direction with a long filament fabric;

thermally laminating the first transparent substrate 12 and the second transparent substrate 14 into a primary lamination containing the first and second transparent substrates in such a way that the first alignment film 24 faces the second alignment film 26;

forming a third alignment film 28 on the other side of the second transparent substrate 14;

rubbing the third alignment film 28 with a long filament fabric in a second direction perpendicular to the first direction;

providing a third transparent substrate 16;

forming an apertured electrode 32 on one side of the third transparent substrate 16;

forming a fourth alignment film 30 on the other side of the third transparent substrate 16;

rubbing the fourth alignment film 30 in the second direction with a long filament fabric;

applying a frame 36 to the side of the third transparent substrate 16 formed with the fourth alignment film 30;

thermally laminating the third transparent substrate 16 and the primary lamination containing the first and the second transparent substrates into a secondary lamination in such a way that the fourth alignment film 30 faces the third alignment film 28;

dicing the secondary lamination containing the first, second and third transparent substrates into a plurality of lens units;

injecting liquid crystal into the gap between the first transparent substrate 12 and the second transparent substrate 14 and into the gap between the second transparent substrate 14 and the third transparent substrate 16; and sealing each lens unit.

The first transparent substrate 12 and the third transparent substrate 16 are made of glass while the second transparent substrate 14 is made of plastic material.

In this manner, a plurality of double-layer liquid crystal lenses 10 can be manufactured.

The alignment film may be formed by coating polymer solution and then drying, baking and/or curing the coating of polymer solution. Alternatively, the alignment film may be formed by printing, transferring or adhering.

Rubbing on the alignment film may be achieved by a roller of long filament fabric, cotton fabric or flannelette fabric. The alignment film is moved with respect to the roller in rotation so that the alignment film is rubbed in a specific direction.

According to the above method, the first alignment film 24 may be directly disposed on one side (the upper side) of the first transparent substrate 12 without formation of the transparent ITO electrode 22, and the apertured electrode 38 is formed on the other side (the lower side) of the first transparent substrate 12. By this way, the double-layer liquid crystal lens 10a can be manufactured.

It should be understood that the method according to the present invention is not limited by the above order. After thermally laminating the third transparent substrate 16 and the primary lamination containing the first and second transparent substrates, the apertured electrodes 32, 38 can be formed subsequently.

The method according to the present invention further comprises the step of thinning the first and third transparent substrates by grinding (mechanical manner) from the outer sides thereof or etching the outer sides of the first and third transparent substrates with hydrofluoric acid (chemical manner) for further thinning the first and third transparent substrates, after thermally laminating the third transparent substrate 16 and the primary lamination containing the first and the second transparent substrates and before forming the apertured electrodes 32, 38.

The apertured electrodes 32, 38 may be transparent or opaque, for example, they are transparent as being made of ITO, or opaque as being formed by printing conductive silver paste.

While this invention has been described with reference to the embodiments, it should be understood that various changes and modifications could be made within the spirit and scope of the inventive concepts described. Accordingly, it is intended that the invention shall not be limited to the disclosed embodiments but have the full scope permitted by the language of the following claims.

BRIEF DESCRIPTION OF ACCOMPANYING DRAWINGS

Figure 1:
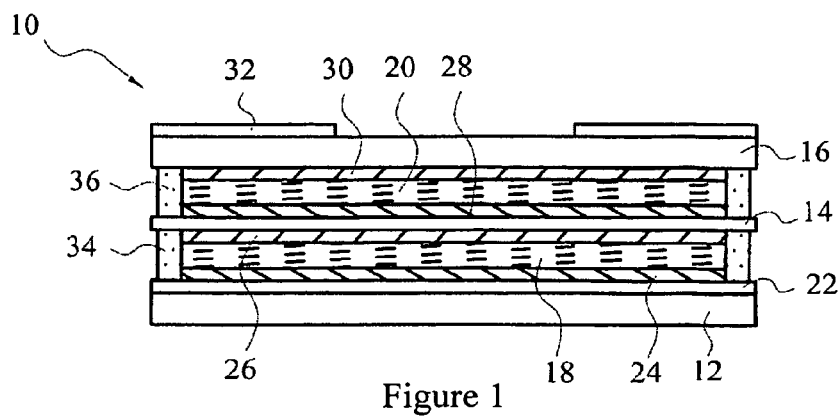
FIG. 1 is a view showing the double-layer liquid crystal lens of the first embodiment according to the present invention.
Figure 2:
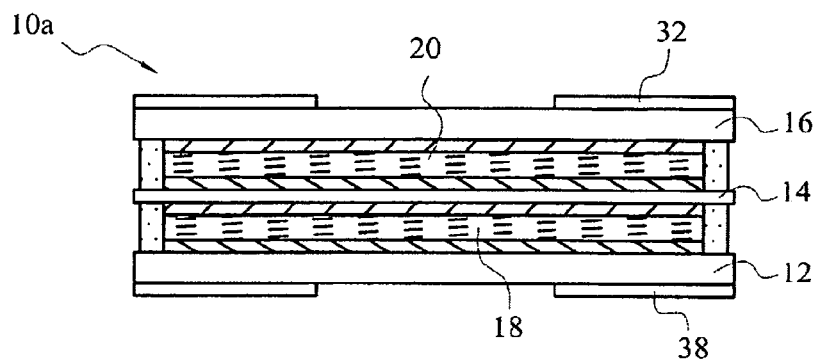
FIG. 2 is a view showing the double-layer liquid crystal lens of the second embodiment according to the present invention.
Figure 3:
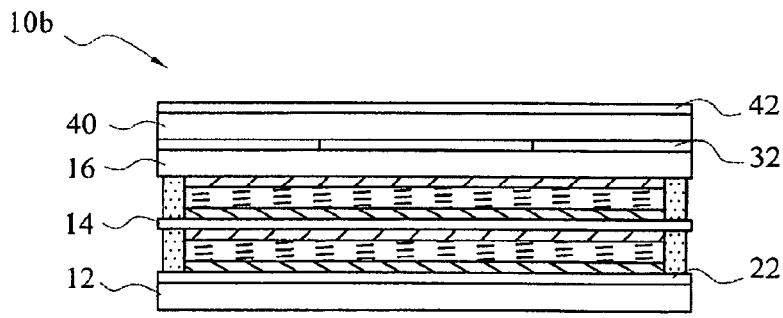
FIG. 3 is a view showing the double-layer liquid crystal lens of the third embodiment according to the present invention.
Figure 4:
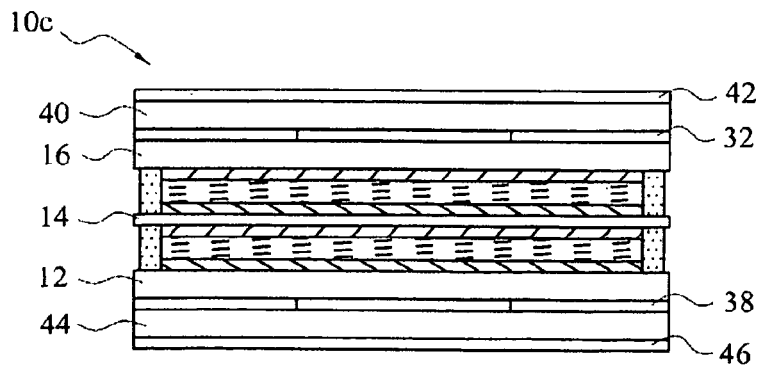
FIG. 4 is a view showing the double-layer liquid crystal lens of the fourth embodiment according to the present invention.
Figure 5:
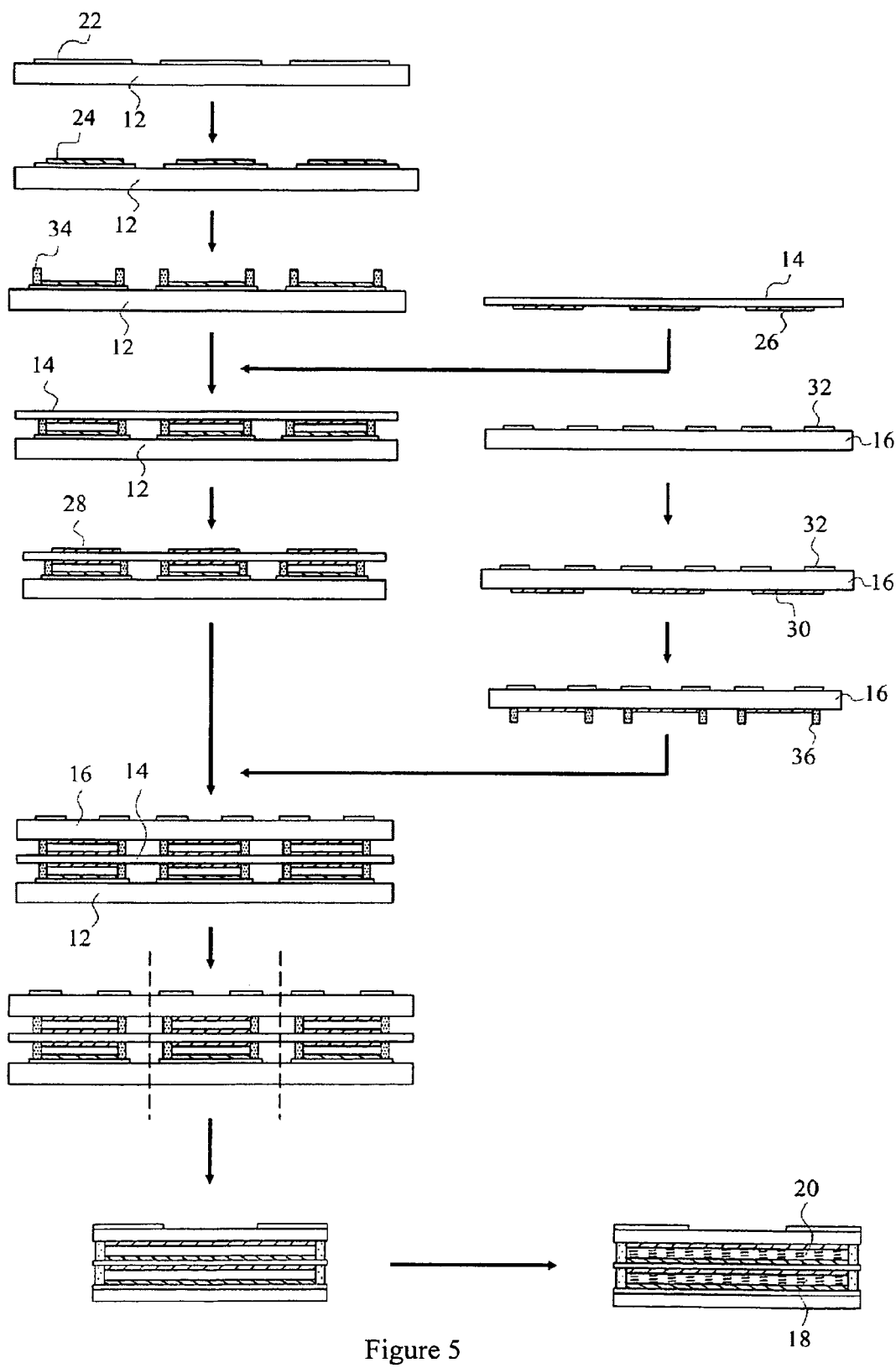
FIG. 5 is a schematic view showing the method for manufacturing the double-layer liquid crystal lens of the first embodiment according to the present invention.

What is claimed is:

1. A double-layer liquid crystal lens, comprising:
a first transparent substrate, having one side provided with a first transparent ITO electrode and a first alignment film disposed on said transparent electrode;
a second transparent substrate, having one side provided with a second alignment film and the other side provided with a third alignment film; the side of said second transparent substrate provided with said second alignment film facing the side of said first transparent substrate provided with said first alignment film, an alignment direction of said first alignment film being parallel to an alignment direction of second alignment film;
a third transparent substrate, having one side provided with an apertured electrode and the other side provided with a fourth alignment film; the side of said third transparent substrate provided with said fourth alignment film facing the side of said second transparent substrate provided with said third alignment film, an alignment direction of said third alignment film being parallel to an alignment direction of said fourth alignment film and being perpendicular to the alignment direction of said first and second alignment films;

a first liquid crystal layer, which is interposed between said first transparent substrate and said second transparent substrate, and is surrounded by a first frame; and a second liquid crystal layer, which is interposed between said second transparent substrate and said third transparent substrate and is surrounded by a second frame;

wherein said first transparent substrate and said third transparent substrate are made of glass while said second transparent substrate is made of plastic material.

2. The double-layer liquid crystal lens as claimed in claim 1, wherein said plastic material for making said second transparent substrate is PET, PEN, PC, PES, PI or ARTON.

3. The double-layer liquid crystal lens as claimed in claim 1, wherein said apertured electrode disposed on said third transparent substrate is formed of ITO or formed by printing conductive silver paste.

4. The double-layer liquid crystal lens as claimed in claim 1, further comprising a first transparent insulation layer provided on said third transparent substrate, a second transparent ITO electrode being disposed on an outer side of said first transparent insulation layer, a focal length of said liquid crystal lens being varied by controlling a voltage applied on the electrodes of said first transparent substrate, said third transparent substrate and said first transparent insulation layer.

5. The double-layer liquid crystal lens as claimed in claim 4, which is used to converge and/or diverge a light beam.

6. The double-layer liquid crystal lens as claimed in claim 4, wherein the first transparent insulation layer is made of glass or plastic material or formed by coating.

7. A double-layer liquid crystal lens, comprising:

a first transparent substrate, having one side provided with a first alignment film and the other side provided with a first apertured electrode;

a second transparent substrate, having one side with a second alignment film and the other side provided with a third alignment film, the side of said second transparent substrate provided with said second alignment film facing the side of said first transparent substrate provided with said first alignment film, an alignment direction of said first alignment film being parallel to an alignment direction of said second alignment film;

a third transparent substrate, having one side provided with a second apertured electrode and the other side provided with a fourth alignment film, the side of said third transparent substrate provided with said fourth alignment film facing the side of said second transparent substrate provided with said third alignment film, an alignment direction of said third alignment film being parallel to an alignment direction of said fourth alignment film and being perpendicular to the alignment direction of said first and second alignment films;

a first liquid crystal layer, which is interposed between said first transparent substrate and said second transparent substrate, and is surrounded by a first frame; and a second liquid crystal layer, which is interposed between said second transparent substrate and said third transparent substrate, and is surrounded by a second frame;

wherein said first transparent substrate and said third transparent substrate are made of glass while said second transparent substrate is made of plastic material.

8. The double-layer liquid crystal lens as claimed in claim 7, wherein said plastic material for making said second transparent substrate is PET, PEN, PC, PES, PI or ARTON.

9. The double-layer liquid crystal lens as claimed in claim 7, wherein said first apertured electrode disposed on said first transparent substrate and/or said second apertured electrode disposed on said third transparent substrate are formed of ITO or formed by printing conductive silver paste.

10. The double-layer liquid crystal lens as claimed in claim 7, further comprising a first transparent insulation layer disposed on said third transparent substrate and a second transparent insulation layer disposed on said first transparent substrate, a side of said first transparent insulation layer opposite to said third transparent substrate being provided with a first transparent ITO electrode, a side of said second transparent insulation layer opposite to said first transparent substrate being provided with a second transparent ITO electrode, a focal length of said liquid crystal lens being varied by controlling a voltage applied on the electrodes of said first transparent substrate, said third transparent substrate, said first and said second transparent insulation layers.

11. The double-layer liquid crystal lens as claimed in claim 10, which is used to converge and/or diverge a light beam.

12. The double-layer liquid crystal lens as claimed in claim 10, wherein the first and second transparent insulation layers are made of glass or plastic material or formed by coating.

\* \* \* \* \*

UNITED STATES PATENT AND TRADEMARK OFFICE
CERTIFICATE OF CORRECTION

| | | |
|---|---|---|
| PATENT NO. | : 8,035,794 B2 | Page 1 of 1 |
| APPLICATION NO. | : 12/461672 | |
| DATED | : October 11, 2011 | |
| INVENTOR(S) | : Chang-Yuan Ju et al. | |

It is certified that error appears in the above-identified patent and that said Letters Patent is hereby corrected as shown below:

Title Page, item (75);

Please correct the first inventor's name from "Ching-Yuan Ju"

to --Chang-Yuan Ju--

Signed and Sealed this
Twelfth Day of June, 2012

David J. Kappos
*Director of the United States Patent and Trademark Office*